No. 701,937. Patented June 10, 1902.
L. T. ROBINSON.
INDICATING INSTRUMENT.
(Application filed Nov. 20, 1899.)
(No Model.) 3 Sheets—Sheet 1.
Fig. 1.
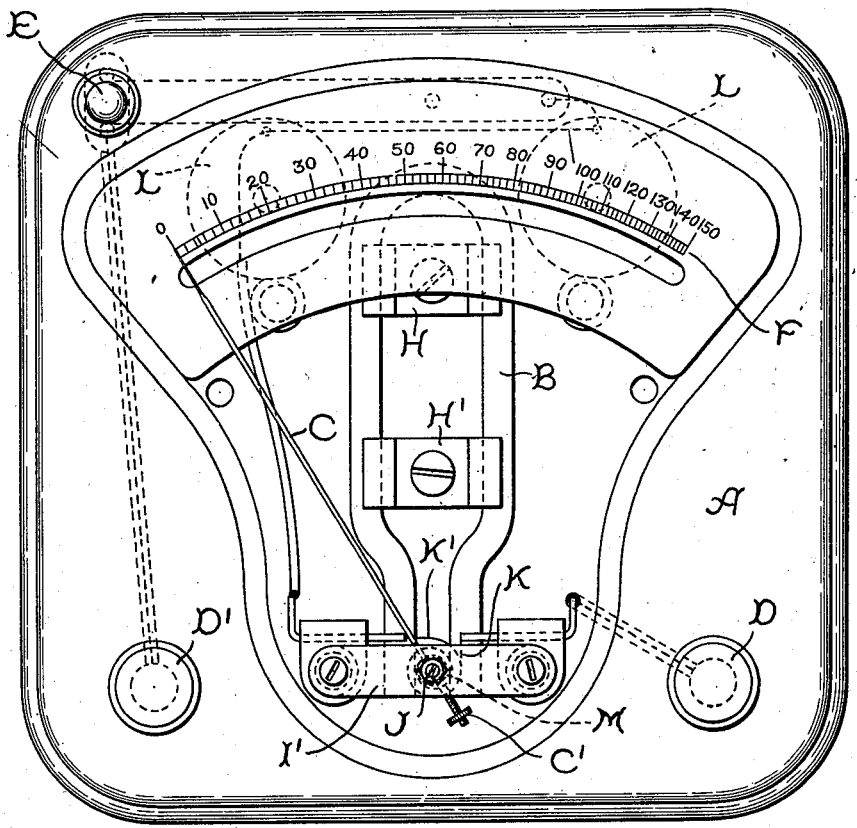
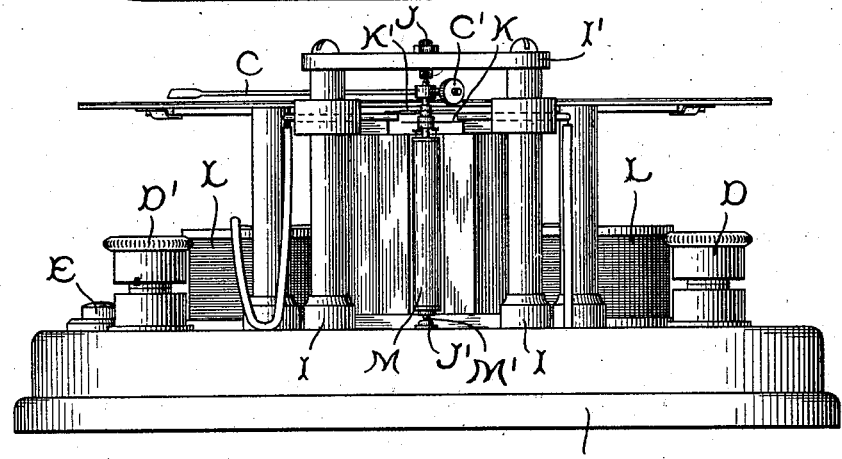
Fig. 2.
WITNESSES:
A. H. Abell.
A. F. Macdonald.
INVENTOR:
Lewis T. Robinson
by Albert G. Davis
Atty.

No. 701,937. Patented June 10, 1902.
L. T. ROBINSON.
INDICATING INSTRUMENT.
(Application filed Nov. 20, 1899.)
(No Model.) 3 Sheets—Sheet 2.
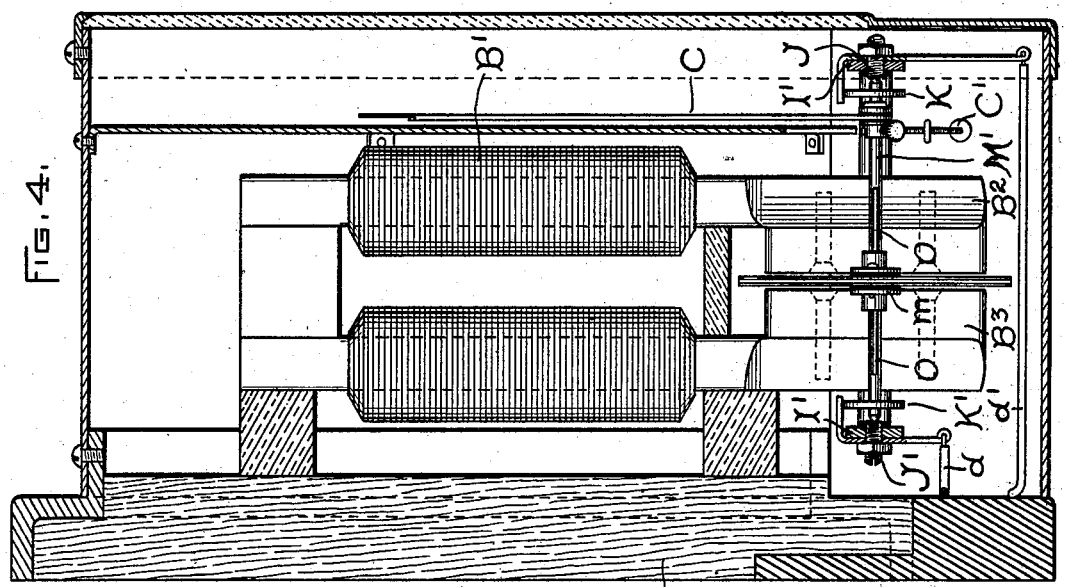
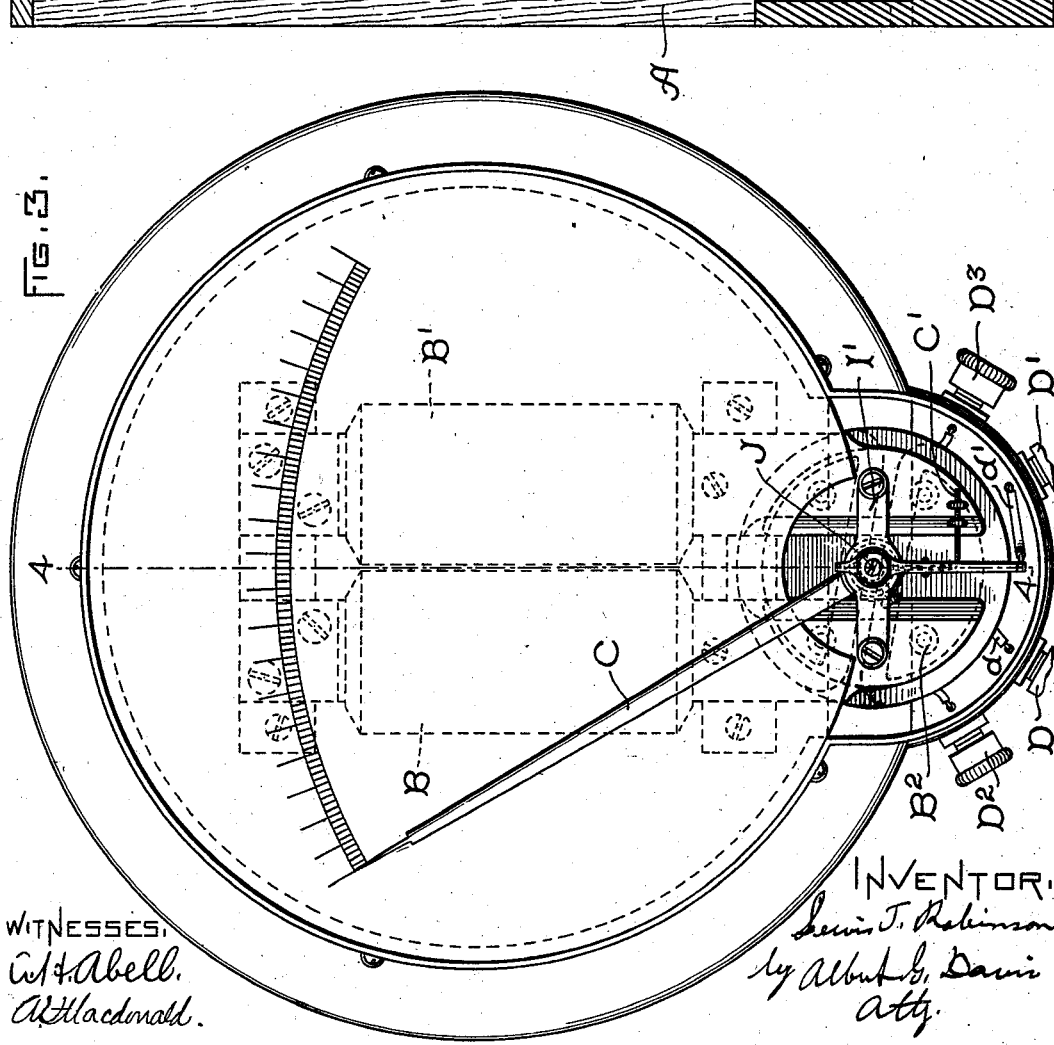
WITNESSES:
W. T. Abell.
A. H. Macdonald.
INVENTOR:
Lewis T. Robinson
by Albert G. Davis
Atty.

No. 701,937.  
L. T. ROBINSON.  
INDICATING INSTRUMENT.  
(Application filed Nov. 20, 1899.)  
(No Model.)  
Patented June 10, 1902.  
3 Sheets—Sheet 3.
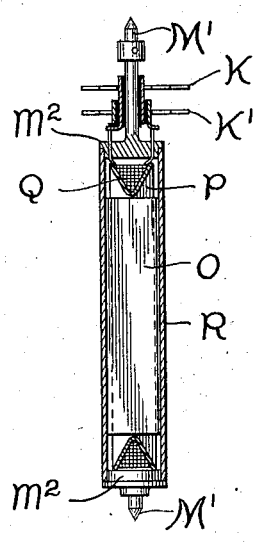
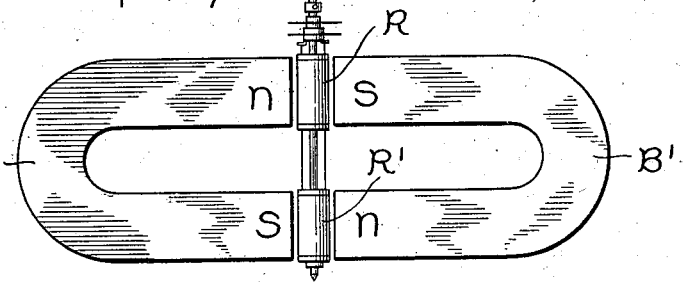
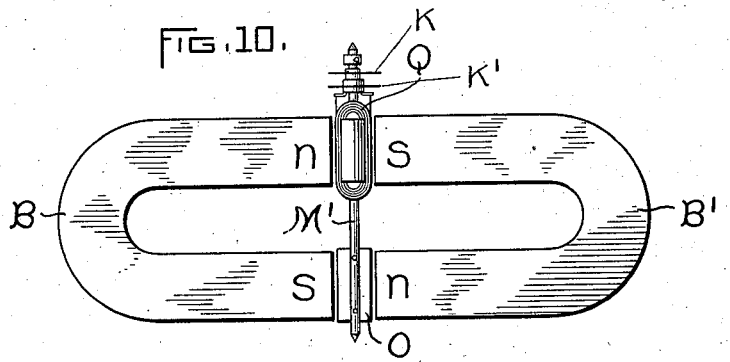
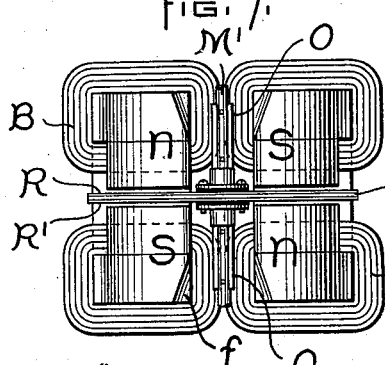
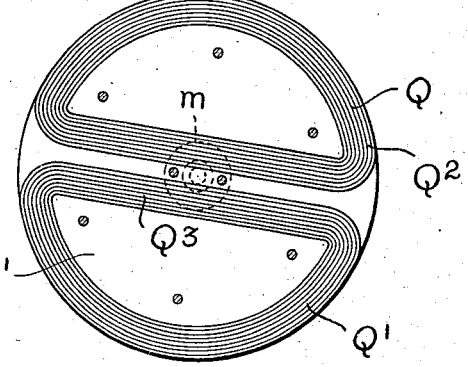
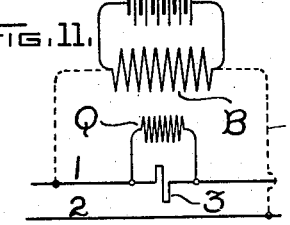
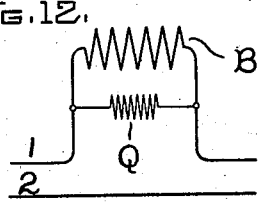
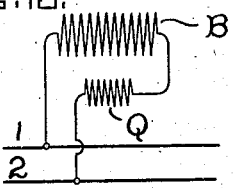
WITNESSES.
INVENTOR.

UNITED STATES PATENT OFFICE.

LEWIS T. ROBINSON, OF SCHENECTADY, NEW YORK, ASSIGNOR TO THE GENERAL ELECTRIC COMPANY, A CORPORATION OF NEW YORK.

INDICATING INSTRUMENT.

SPECIFICATION forming part of Letters Patent No. 701,937, dated June 10, 1902.

Application filed November 20, 1899. Serial No. 737,566. (No model.)

*To all whom it may concern:*

Be it known that I, LEWIS T. ROBINSON, a citizen of the United States, residing at Schenectady, county of Schenectady, State of New York, have invented certain new and useful Improvements in Indicating Instruments, (Case No. 558,) of which the following is a specification.

In the construction of electrical instruments—such, for example, as indicating volt and ampere meters—it is customary to balance the deflecting torque due to the current to be measured or to a current derived therefrom or otherwise functionally related thereto against the restoring torque due to one or more fine springs. In such instruments it is possible to produce an "even scale," as it is called; but the permanency of the calibration of the instruments is liable to be affected by changes in the magnetism of the permanent magnets, which are ordinarily used to furnish the field of force.

Another objection to the instruments above described, which is applicable also to all other types of instruments in which permanent magnets are used, is that the deflecting torque produced by permanent magnets acting on the necessarily feeble currents passing through the movable members of the instruments is always extremely small. It is therefore desirable to employ electrofield-magnets, since such magnets furnish very intense fields of force and create comparatively large deflecting torques, and thus make it possible to increase the precision of the instruments, since they make it possible to increase both the deflecting and restoring torque without sensibly increasing the friction and other losses, which of course increases the accuracy. This is merely a specific statement of the general principle applicable to all measuring instruments that the deflecting and restoring torques should be very large in comparison to the friction in order that the friction, expressed as a percentage, may be negligible; but it is impossible to use electro field-magnets in indicating volt or am meters of the ordinary types, since in such instruments the deflection would be very materially altered by a very slight change in the voltage of the current impressed on the terminals of the field-magnet windings. Consider, for example, the case of an ammeter measuring the current in a railway-generator or feeder-circuit. It is, I find, very convenient to excite the field-magnets by connecting them simply in multiple with the terminals and to excite the armature by connecting it around a small series resistance in the circuit. In commercial work the voltage delivered by a railway-generator may vary between four hundred and fifty and six hundred and fifty volts, and such variation sometimes takes place almost instantaneously. Any such variation as this would destroy the accuracy of reading of an ammeter constructed according to the ordinary fashion.

It has hitherto been proposed to produce the restoring torque of an electrical measuring instrument by a strip of magnetic material working in the same permanent field as that in which the deflecting-coils work, and in such cases advantage has been taken of the fact that a slight variation in the strength of the magnetic field tended to increase or decrease both the deflecting and restoring torques, and therefore did not affect the instrument very materially; but such instruments as heretofore constructed have not been able to maintain their accuracy under large variations of field-magnet strength, such as would be caused by exciting electrofield-magnets in multiple with ordinary station bus-bars, which is the preferred form of excitation of apparatus constructed in accordance with my present invention.

In the so-called "magnetic-return" instruments as hitherto constructed and as described above, changes in the field-magnet strength have changed the deflecting torque in direct ratio to the change in flux, but have changed the restoring torque in more than direct ratio. This is due to several causes; but the most important is the fact that the strength of magnetism in the return-strip is increased with an increase of flux. Suppose the strip to be worked well below the bend in the saturation-curve and suppose also that the strip is at right angles to the axis of the coil. Then the deflecting torque becomes:

$$\text{Deflecting torque equals } AIF \cos x.$$

Where A is a constant, I is the current in the coil, F is the flux in the space in which the coil works, assumed to be uniform and unidirectional and at right angles to the axis of the coil in the zero position, and $x$ is the angle of deflection. Under the same circumstances the restoring torque is:

Restoring torque equals BFM sin. $x$, where M is the strength of pole of the strip, the poles being assumed to exist at the ends of the strip, evidently $M = f(x)$, but what function depends on circumstances. At any particular value of $x$, with the instrument at rest, Restoring torque equals deflecting torque or AIF cos. $x$ = BFM sin. $x$, which reduces to $$\tan. x = \frac{DI}{M},$$

D being a new constant, or $$x = \tan.^{-1} \frac{DI}{M},$$

that is to say, the deflection or reading for a given current in the coil is constant only on the assumption that, first, the magnetism of the strip is constant; second, the poles of the strip remain fixed in space as the magnetism changes, and, third, the strip does not distort the field in which it works, or at least does not distort it differently as the flux changes. Now in the old magnetic-return instruments none of these conditions were fulfilled; but, on the contrary, the following causes of error existed: first, the changes in flux changed the position of the effective poles of the strip; second, the changes in flux changed the magnetism of the strip; third, the strip itself modified or distorted the flux in the air-gap, and the amount of this modification or distortion varied with changes in the flux or magnetomotive force in the air-gap. The discussion has assumed also that $M = f(x)$ and that this function is a linear one and single-valued. As a matter of fact, this is not true, since the iron of the strip is liable to hysteresis, so that its magnetism is not always the same for a given position of the strip and value of F, but varies in accordance with its past history and is generally higher at a given position if the indication or flux is falling—that is to say, if the magnetomotive force in the strip is falling from a high to a low value than it would be if the indication or flux were rising.

It is not pretended that the above elementary discussion is complete; but it is sufficient to indicate in a general way the causes of error in the apparatus on which my invention is an improvement; neither do I wish to be understood as stating that such instruments were inoperative or useless, since the compensation was in some cases quite good enough for ordinary commercial instruments with carefully-constructed permanent magnets; but this very use of permanent magnets necessarily involved the use of very delicate forces with a corresponding liability to error and increase in first cost and in the difficulty of making repairs and adjustments.

In constructing instruments under my present invention I use a return-strip of exceedingly-thin material working in a field strong enough to saturate it or at least to carry its magnetism above the bend of the hysteresis curve in all positions. It will be seen that such a strip will not exert any substantial effect on the flux passing between the pole-pieces and will not as it assumes different positions in the magnetic field substantially vary the strength or distribution of said field. Further, its own magnetism will remain very constant in all positions, at least unless it is deflected to an unreasonable extent, and the effect of hysteresis in the strip will therefore be very small. To make this result more certain, I prefer to so design the instrument that the strip is considerably narrower than the distance between pole-pieces. The strip is so designed with reference to the magnetomotive force in the air-gap that it is somewhere near saturation, so that its magnetism is not appreciably varied by changes in the flux. Such a strip follows substantially in all positions the law $M =$ a constant and ceases to depend on the value of $x$. Further, the effective position of its poles does not substantially change, so that the law of the instrument becomes simply:

$$x = \tan.^{-1} DI.$$

It is of course easy to change this to the more general law: $x = f(I)$, the function being a simple linear one by merely adjusting the angle between the coil and the strip. This has the effect of varying the scale, which is "crowded" at the top if the law is:

$$x = \tan.^{-1} DI,$$

and may be crowded at the center or at the lower end or at both ends or made substantially even by a proper adjustment of the angle above mentioned and by properly shaping the coil and pole-pieces in at least one of the forms hereinafter to be discussed, that shown in Figures 3, 4, 7, and 8.

Having thus described in a general way the nature and object of the present invention, I would refer for an understanding of the scope thereof to the claims hereto appended, and for a detail description of various devices embodying the invention I would refer to the following description to be read in connection with the accompanying drawings, in which—

Fig. 1 is a plan view of my improved instrument provided with a permanent field-magnet and arranged to act as a voltmeter. Fig. 2 is an end elevation of the same. Fig. 3 is a plan view of an astatic instrument having electro field-magnets. Fig. 4 is a section taken on the line 4 4 of Fig. 3. Figs. 5 and 6 are details of the moving element of the permanent-magnet instrument. Figs. 7 and 8 are details of the electro-field-magnet instrument. Figs. 9 and 10 are modifications of an astatic instrument, and Figs. 11, 12, and 13 are diagrams showing the method of connecting the circuits of the electro-field-magnet type of instrument.

Referring more particularly to Figs. 1 and 2, which show an instrument embodying some features of my invention, B is a permanent horseshoe-magnet secured to wooden base A by clamps H and H', and mounted on shaft M' between the adjacent inner faces of the magnet is the moving system M of the instrument. Two pillars I, extending upward from the base, form a support for the cross-piece I', in which is mounted the jewel-bearing J. The lower end of the shaft M' is supported by jewel J', suitably mounted in base A. Binding-posts D D' are situated on the base. The post D is connected directly with the moving element by a flexible connection K, and the post D' is similarly connected by a flexible connection K' through the resistance-wire L, which is wound on spools and situated on the base A. The flexible connections K and K' are preferably made of some very light conducting material. The lighter and more flexible they are the more accurate the readings of the instrument become. They are not springs, nor are they designed to act as such. A switch E is employed to make and break the circuit through the moving element. Soldered or otherwise secured to shaft M' is an indicator C, having a counterweight C' balancing the weight of the needle. The indicator swings over a graduated scale F as current passes through the moving element.

The moving element, Figs. 5 and 6, consists of a coil of fine wire Q, wound upon a spool or support P, preferably formed of good conducting material in order to damp the oscillations of the coil. I have shown the moving element provided with a coil having a number of convolutions; but in practice, particularly for work on heavy currents, it is sometimes desirable to employ a single loop of wire constituting a partial turn. The coil-support P is mounted within a metal tube R, preferably of copper, which also tends to damp the oscillations of the needle. The ends of the tube are fitted with heads $m^2$ $m^2$, each of which is extended to form one of the shafts or pivots M' M'. Mounted within the tube R and within the influence of the field-magnets is a magnetizable return-strip O. As here shown, it consists of a very thin piece of magnetic material O, occupying the space within the spool P, and is soldered or otherwise secured in the tube R. I may form this strip by taking a piece of copper or similar material and plating it with magnetic metal—as iron or nickel, for example. I have obtained very good results with a copper strip plated with nickel; but I also find that a very thin strip of soft iron gives good results, and as long as the general directions given above are followed the particular nature of the strip is of minor importance. When assembled in the instrument, the magnetic returning piece O is substantially at right angles to the side faces of the magnet, so that the flux will pass from one face to the other through it.

The scale F, Fig. 1, is shown as being more open at the zero end than at the other end. This relation may be changed so that the scale is less open at the start, but opens up at the other end, or both ends may be contracted and the center open, or by proper design a fairly-uniform scale may be produced. This is accomplished by adjusting the position of the magnetic returning piece O with respect to the coil Q.

For ordinary conditions there is no need of making an instrument embodying my invention astatic, as the readings are not affected by ordinary changes of strength in the field-magnet; but for certain special conditions I have found it desirable to do so. For example, assume that a conductor carrying a heavy current passes across the back of the switchboard on which the instrument is located with a single field-magnet, the currents flowing in the bus-bars, &c., might distort the field of the instrument-magnets. If the instrument was permanently located on front of the switchboard and the conductor located on the back and always carried a certain amount of current, then the instrument could be adjusted to the new condition by simply bending the needle or moving the scale; but this condition can seldom be fulfilled. By making the instrument astatic one portion of the field, as that of the upper magnet, will be distorted in one direction, while the field of the lower magnet when poles are reversed relative to the upper magnet will be distorted an equal amount in the opposite direction, and the resultant of these two fields by reason of the equal distortion of both of them will leave the zero position the same as though the instrument were uninfluenced by any external field. I also prefer to use an electromagnetic field for reasons above set forth, and by my present invention I am able to accomplish this. In Figs. 3 and 4 the invention is shown as applied to an astatic instrument having two electromagnets B and B' situated one on each side of shaft M' and having their poles reversed, so that a magnetic flux is set up between the poles of the magnets, in which flux the moving coil Q is situated, and a second magnetic flux across from one magnet to the other at right angles, or substantially so, to the main field-flux, in which latter flux is located the magnetic return system O. The cores $B^2$ are preferably provided with large semicircular pole-faces $B^3$, which are separated by a small air-gap, so that the field-flux set up by the magnets is very intense and has an extended area. The cores $B^2$ are composed of two parallel iron bars, over which the energizing-coils B' are wound. To facilitate the manufacture of the instruments, the enlarged semicircular pole-faces B³ are detachably secured to the magnet-cores. In the present instance the faces are secured by screws; but any other form of securing device may be employed.

To increase the torque of the instrument for a given current, it is necessary to increase the diameter of the moving coil which carries the current to be measured or a definite portion thereof, and with the arrangement shown in Figs. 1 and 2 this would necessitate making too great an air-gap in the magnet-circuit. So I change the plane of the coil and mount it at an angle, preferably a right angle, to the shaft, with the body of the coil projecting between the pole-faces of the magnets. By this arrangement the torque of the instrument can be increased to any desired amount without increasing the air-gap between adjacent poles. The coil can be made thin in the direction of the magnetic flux, and as the poles are separated by a small air-gap a powerful field can be maintained.

The coil is wound in the manner shown in Fig. 8 and comprises two semicircular elements $Q'$ $Q^2$, each having a straight side $Q^3$ and so connected that when current passes through them they will produce rotation in the same direction. The coil is situated between two thin metal disks R and R', that act as a damping device and prevent oscillation of the moving system. I have found by experiment that the results obtained by the damping device are more satisfactory if the disks R and R' are permitted to project beyond the semicircular pole-faces of the magnets, as this furnishes a better path for the eddy-currents which are induced in the disks. In certain instruments the damping effect of these disks when moving in the strong field set up by the magnets was so great that it was necessary to slit the disks in order to reduce it. The disks are insulated from each other and are secured to the upper and lower parts of shaft M' by insulated heads $m$. The outer terminals of the coil are connected, respectively, to the upper and lower parts of the shaft, and connection with the exterior circuit is established by means of thin flexible and spirally-wound conductors K and K', which are secured to the shaft at their inner ends and to a stationary part of the instrument at the outer ends. These conductors in no way form the equivalent of the springs commonly used to return the moving system to zero, but so far as possible are made to offer no assistance or retardation to the movement of the coil system. The shaft M' is supported by jewel-bearings J and J', Fig. 4, which are mounted in the transverse pieces I'. The needle is secured to the shaft M' and is provided with a counterweight C'. The binding-post D' is connected by a wire $d'$ and a flexible connection K with one end of the armature-coil Q and the binding-post D with the opposite end of the armature-coil by a wire $d$ and a flexible connection K'. The binding-posts D² and D³ are also connected to the outer ends of the field-magnet coils.

The magnetic return mechanism consists of two small thin strips of nickel or soft iron or other magnetic material, which are riveted to the shaft M' and are situated above and below the coil Q and are acted upon by the transverse or leakage field-flux. If desired, however, the magnetic return mechanism shown in Figs. 5 and 6 may be employed instead of the nickel strips. The inner surfaces of the pole-pieces are chamfered at $f$, so that the field-flux will be directed through the magnetic return-strips O. It will be seen that the armature-coil Q is located in a very powerful field whose lines of force travel in a vertical direction and that the coil is separated from the pole-pieces by a very small air-gap, whereas the magnetic return-strip O is located in a field created by the field-magnets at right angles to the first-mentioned flux. The general design is such as to fulfil the conditions laid down above—that is to say, the field in which the strip works is so powerful, with reference to the strip, that the strip is always highly magnetized in all positions throughout the working range of the instrument, the reaction of the strip on the flux is so small as to produce no serious error, and the poles of the strip remain substantially fixed in position as the flux varies.

In the commercial operation of the instrument it is possible to obtain a fairly-constant field strength; but in order to determine the variation in reading caused by abnormal changes in the field strength I tested an instrument constructed in accordance with my present invention, the field of which was excited by fourteen hundred and seventeen ampere turns, and the movement of the needle from zero to maximum with a certain current in the coils Q Q' was 27.6 degrees. The same instrument was then tested with a field excitation of twelve thousand seven hundred and fifty-three ampere-turns and the movement of the needle was only 32.1 degrees for the same current in the armature-coils Q Q'. In other words, the field excitation was increased by eight hundred and sixty-five per cent. and the difference in reading was only six and one-tenth per cent.

With the ordinary working conditions, when used as a voltmeter or ammeter on a commercial "constant-potential" circuit, the magnetomotive force in the field would not vary over fifty per cent., and the field strength of the magnet would of course vary still less, as the limbs of the magnet are worked near the point of saturation, and this in an instrument of the character described I find produces an error which is entirely negligible.

Instead of making an instrument of exceedingly delicate construction, as usual, I make the parts of substantial size, so that the friction of the moving part or parts, together with the resistance offered by the connections K and K', becomes negligible in comparison with the deflecting and restoring torque. I may thus dispense with the jewel-bearings J and J' and substitute ordinary metal bearings.

In Fig. 9 is shown an astatic instrument provided with two permanent magnets B and B', arranged so that unlike poles are opposite. Moving within the field of the magnets is an astatic element comprising two coils inclosed within metal tubes R R', each coil being provided with a magnetic return of the character shown in Fig. 5. The supports for the coils and arrangements of the connections to and from them may be as previously described.

In Fig. 10 is shown a further modification of an astatic instrument, in which two permanent magnets B and B' are arranged with unlike poles opposite each other, with the moving element located between them. A coil Q is mounted on the upper end of the shaft M' and moves within the influence of the upper parts of the magnets B B', and the return-strip O, instead of being placed within the coil as in the previous cases, is located at the bottom of the shaft M' between the lower parts of the magnets. If by any means the magnet B' becomes slightly weakened, it will not affect the operation of the instrument, for when the field tending to move the coil is varied a corresponding variation is made in the returning or retarding effect.

In Fig. 11 is shown one method of connecting the coils of the electromagnetic field instrument in circuit in order that the instrument may act as an ammeter. The circuit-mains 1 and 2 are connected to the source of supply that is to be measured, and in circuit with one of the mains is a resistance 3, around which the armature-coil Q is connected in shunt. The field-coils may be excited from a separate source 4. This may be a battery, as indicated, or a portion of the light-circuit, the potential of which is fairly constant, or the field may be supplied in shunt from the mains 1 2, as shown by the dotted lines 5.

In Fig. 12 the field-coils B are included in series circuit with one of the mains and the armature in shunt to the field-coil. In Fig. 13 the field and armature coils are in series with one another and are connected across mains 1 and 2. In this form the instrument will act as a voltmeter. Resistance may be interposed in any of these circuits as desired.

It often happens that when instruments of ordinary construction are received by the customer the needle will not return to zero. This may be caused by the pointer being bent or by a change in the spring or gravity return causing the moving system to be slightly changed from the position it occupied while being calibrated. From the appearance of the instrument it is impossible to tell whether the fault is entirely with the pointer, the spring or gravity return, or both. This necessitates recalibration, usually obtained by returning the instrument to the factory, which causes delay and expense.

In instruments constructed as above described if the needle does not point to zero when no current is flowing in the current-coil it shows at once that the needle is bent, as the magnetic system always returns to the same position. It will be seen that this is of great importance, for it reduces the liability of damage to the instrument to the minimum, and the indicator can readily be set to the proper zero without recalibration and with the certainty that this is all the attention the instrument requires.

What I claim as new, and desire to secure by Letters Patent of the United States, is—

1. As a means of producing restoring torque in an indicating instrument, a strip of magnetic material magnetized above the bend of the saturation-curve.

2. The combination in an electrical measuring instrument of a field-magnet, a deflecting mechanism, and a thin strip of magnetic material magnetized above the bend of the saturation-curve.

3. The combination in an electrical measuring instrument of a field-magnet, a deflecting mechanism, and a thin strip of magnetic material too small to seriously distort the field.

4. The combination in an electrical measuring instrument of a field-magnet, a deflecting mechanism, and a thin strip of magnetic material proportioned so as to cause a distortion of the field so small that its variation with variations in flux will not seriously affect the reading of the instrument.

5. In an electrical measuring instrument, the combination of a field-magnet structure, a deflecting-coil, and a strip of magnetic material working in the field of the magnets, the said strip being thin and of such a width as to present an air-gap between the strip and the magnet large in proportion to the width of the strip.

6. A magnetic returning device for instruments, consisting of a body of non-magnetic metal, wholly or partially covered with magnetic metal.

7. In an electric measuring instrument, the combination of an electro field-magnet, a coil traversed by current from the circuit to be measured, a piece of magnetic material having a support in common with the coil, and acted upon by the same source of flux as the coil, for returning the moving system to zero when current ceases to flow in the coil, and a piece of good conducting material carried by the moving system to damp the oscillations.

8. In an electric measuring instrument, the combination of a pair of iron field-magnets forming an astatic couple, pole-faces for the magnets separated from each other by small air-gaps, a flat coil mounted for movement between the pole-faces, and a piece of iron located within the influence of the pole-pieces for returning the moving coil to zero.

9. In an electric measuring instrument, the combination of two iron field-magnets arranged to form an astatic couple, pole-faces for the magnets, separated by a small air-gap, a coil mounted on a shaft and at an angle thereto, and adapted to move between the pole-faces, a magnetic return mechanism mounted on the coil-shaft and acted upon by the same magnets which move the coil, the arrangement of parts being such that the portion of the field-flux tending to move the coil is greater than the portion of the field-flux acting upon the magnetic return mechanism.

10. In an electric measuring instrument, the combination of a moving coil mounted on a shaft, a pair of field-magnets arranged to form an astatic combination, and situated with their poles above and below the moving coil and in close proximity thereto, and a magnetic return mechanism, situated between the pair of field-magnets, and acted upon by a flux which is at right angles to the main field-flux; the arrangement being such that both the coil and magnetic return mechanism are correspondingly acted upon by changes in field strength.

11. In an electric measuring instrument, the combination of a pair of iron field-magnets arranged to form an astatic combination, semicircular pole-faces for the magnets, a coil mounted at an angle to its supporting-shaft, and moving between the pole-faces, a magnetic return mechanism located between the pair of poles for returning the moving system to zero, and means for directing a portion of the field-flux so that it will pass through the magnetic return mechanism.

12. In an electrical measuring instrument, the combination of a pair of field-magnets arranged to form an astatic combination, a motor mechanism situated in one portion of the field, and a magnetic return mechanism situated in another portion of the field, the strength of which differs from the first-named portion; the arrangement of parts being such that the motor and return mechanism are correspondingly acted upon by changes in field strength.

13. In an ammeter, a moving coil excited in series with the main current and a field-energizing means excited in multiple with the main current and a magnetic return piece for the moving coil.

14. In an electric measuring instrument, the combination of a pair of magnets united to form an astatic combination, a coil system mounted for movement between the poles of both magnets, and a magnetic return mounted for movement in the flux between the magnets the moving coil and magnetic return being alike subject to changes in strength of the field-magnets.

15. In an electric measuring instrument, the combination of a pair of magnets united to form an astatic combination, a moving coil system mounted for movement between the poles of both magnets, and a pair of magnetic return-strips, one of which is situated above the coil and the other below the coil, for returning the coil to its initial position; the field-flux in which the said return-strips are located being subject to changes corresponding to those in the field-magnet.

16. In an electric measuring instrument, the combination of a magnet, a moving-coil system mounted for movement between the poles of the magnet, a shaft for supporting the moving-coil system, and magnetic return-strips for returning the moving system to zero, which are mounted in slots cut in the coil-shaft.

17. In an electric measuring instrument, the combination of a magnet, a coil system mounted for movement between the poles of the magnet, a damping-disk situated between the coil and the pole-face of the magnet, which extends beyond the outer periphery of the pole-face, and a magnetic return mechanism for the moving coil.

18. In an electric measuring instrument, the combination of a pair of magnets united to form an astatic combination, a coil system mounted for movement between the poles of both magnets, damping-disks situated between the coil and the pole-faces, which extend beyond the pole-faces at all points, and a magnetic return mechanism for the moving coil.

19. In an electric measuring instrument, the combination of a pair of magnets united to form an astatic combination, each magnet comprising two parallel cores with semicircular detachable pole-faces for the cores.

20. In an electric measuring instrument, the combination of a pair of magnets united to form an astatic combination, each magnet comprising two parallel cores with semicircular detachable pole-faces for the cores, and an energizing-coil wound on each core.

21. In an electric measuring instrument, the combination of a pair of electromagnets united to form an astatic combination, a coil mounted for movement between the poles of both magnets, parallel cores for each magnet, energizing-coils for the magnets, detachable semicircular pole-faces for the cores, and chamfered portions on the cores, so arranged that they direct the direction of the field-flux.

In witness whereof I have hereunto set my hand this 15th day of November, 1899.

LEWIS T. ROBINSON.

Witnesses:
ADA E. GARLAND,
CHARLES H. EMERSON.